April 12, 1960      G. P. DENNIS      2,932,430
FEEDING OF GRANULAR MATERIALS CAPABLE OF FLOWING
Filed May 27, 1957      4 Sheets-Sheet 4

FIG. 4.

INVENTOR
GEORGE POLLARD DENNIS
BY
Mead, Browne, Schuyler & Beveridge
ATTORNEYS

United States Patent Office 2,932,430
Patented Apr. 12, 1960

2,932,430

FEEDING OF GRANULAR MATERIALS CAPABLE OF FLOWING

George Pollard Dennis, Liverpool, England, assignor to Lockers (Engineers) Limited, Warrington, Lancashire, England, a British company Application May 27, 1957, Serial No. 661,672

Claims priority, application Great Britain May 29, 1956

10 Claims. (Cl. 222—55)

The present invention relates to a method and apparatus for feeding granular materials capable of flowing.

Granular materials are often fed from hoppers or bunkers onto an endless conveyor and in many cases vibratory feeders are used to extract the material from the hoppers and to deposit them onto the conveyor. In certain applications there is a demand for a substantially constant rate of delivery of material by the conveyor. This presents a problem particularly when more than one feeder is feeding materials onto the same conveyor belt as it becomes increasingly difficult to control the total weight of material delivered by the conveyor.

An object of the present invention is to provide a method and apparatus for feeding granular materials at a substantially constant rate.

According to one feature of the present invention a method of controlling the rate of delivery of granular materials capable of flowing in which the material is delivered by a feeder system to a continuously moving endless conveyor, includes the steps of deriving from at least one load cell supporting at least a part of the conveyor and responsive to the instantaneous weight superimposed thereon, an electric signal commensurate with the instantaneous weight of material on said part of the conveyor, and controlling the rate of operation of the feeder system in accordance with any variation of said weight of material from a predetermined value.

The term "load cell" is intended to cover the sensing element of an electronic or electrical strain gauge, such as a resistance or crystal strain gauge.

According to a further feature of the present invention, apparatus for feeding at a substantially controlled rate granular materials capable of flowing comprises a movable endless conveyor, at least one load cell supporting at least a part of a supporting framework for the conveyor, a feeder system for supplying material to the conveyor, and control means responsive to electric signals derived from said at least one load cell in response to the weight of material on the conveyor and controlling said feeder system to increase or decrease the rate of feed of material to the conveyor in response to a decrease or increase of weight of material on the conveyor.

According to a still further feature of the present invention there is provided automatic control apparatus for controlling the feed rate of material by a moving conveyor in which at least a part of the conveyor supporting structure is at least in part supported on at least one electronic load cell and in which a controller to which is fed an electric signal derived from the load cell is adapted to control a feeder system supplying material to the conveyor in response to variations in the weight of material on said part when said weight varies outside limits on either side of a predetermined value so as to restore said weight towards the predetermined value.

The present invention may be applied to a system in which a single feeder supplies material from a single bunker to a single conveyor. The invention may also be applied to a system in which a plurality of feeders each supply material from individual hoppers or proportioning bins onto a common conveyor, and the rate of delivery of material by all the feeders may be controlled in response to variations in the weight of material on the conveyor. Moreover, the controller may be so arranged that the rate of operation of any single feeder may be altered relatively to the rates of feeding of the other feeders, whereby any desired proportioning of materials fed by the individual feeders may be obtained. Alternatively, the feeders may be arranged in two or more groups disposed in succession along the line of a single conveyor, and an independently supported section may be disposed between any two groups in addition to an independently supported section after the last group, so that not only the total quantity of material fed per unit time but also the proportioning of materials fed by the two groups can be maintained substantially constant.

In a preferred embodiment a single bunker or hopper is provided above the line of an endless conveyor and beneath the bunker or hopper there is provided an electrically operated vibratory feeder for extracting material from the hopper and depositing it on the conveyor. Downstream of the feeder a section of the supporting framework with its associated conveyor rollers is supported independently of the remainder of the framework by a plurality of load cells. As is well known to those skilled in the art one form of load cell comprises a plurality of resistance strain gauges arranged in a bridge circuit. A substantially constant potential may be applied to one diagonal of the bridge circuit and when a weight is applied to a load cell the bridge is unbalanced and an electrical potential appears across the other diagonal of the bridge, such potential may be amplified if necessary and applied to a load indicator. One eminently suitable form of indicator is a potentiometric controller under the trade name of "ElectroniK" manufactured by Minneapolis-Honeywell Regulator Co. and operating on the Brown "ElectroniK" continuous balance system. This is described in Bulletin No. B15–6A published by the aforementioned company. Such controller can have a suppressed scale or false zero to allow for the signal delivered by a load cell due to the tare weight, that is to say, the weight of the particular conveyor itself and the part of the supporting structure superimposed on the load cell whereby only incremental signals will be indicated. Such a controller includes an indicator and is provided with manually adjustable upper and lower limit contacts such that a circuit is completed through these contacts when the quantity of material per unit time as indicated by the indicator is below or above desired values. The closing of either of these upper and lower limit contacts brings about an alteration in the rate of operation of the feeder in order to increase or decrease respectively the rate of feeding of material from the hopper to the conveyor. Alterations in the rate of operation of the feeder may be obtained either by increasing or decreasing the voltage of an electricity supply supplied to the feeder, or by alterations in the wave-form of the electricity supplied to the feeder. Variation in voltage may be obtained by increasing or decreasing the resistance value of a resistor in series with the feeder, whilst long term variations may be obtained by means of a continuously variable auto-transformer having a movable tapping driven by a small electric motor via a transmission having a lost motion element. Thus immediate correction of the rate of feed of the feeder results from variations of the resistor, and if such correction is insufficient the position of the variable tapping of the auto-transformer is altered to effect a long-term variation.

The invention will now be more particularly described by way of example with reference to the accompanying drawings in which.

Figure 1:
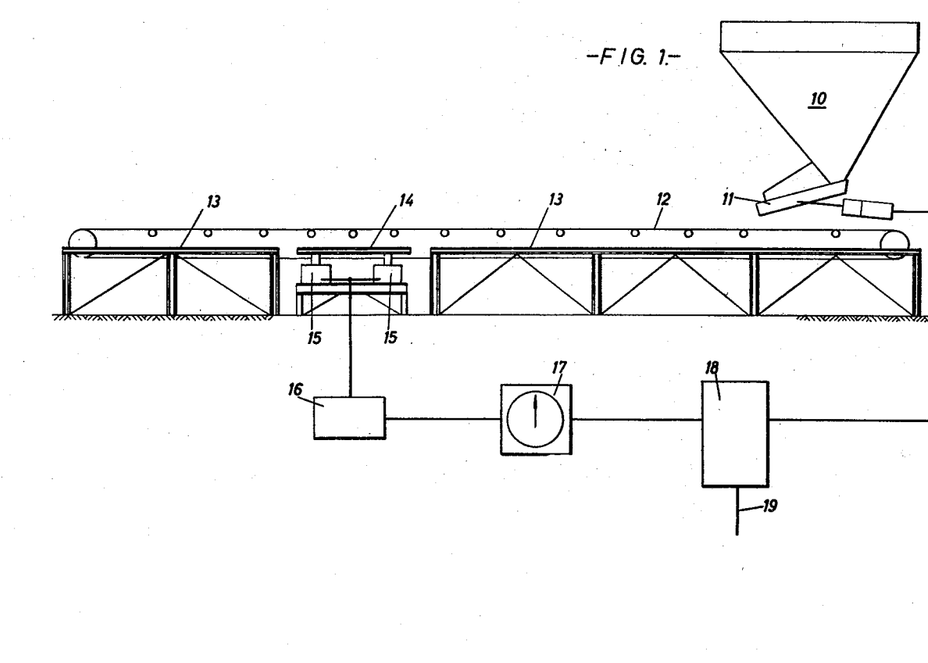
Fig. 1 is a diagrammatic illustration of one embodiment of the invention.

Referring to Fig. 1, a hopper 10 is provided at its lower end with an electrically operated vibratory feeder 11 for extracting granular material from the hopper 10 and delivering it onto an endless conveyor indicated generally at 12. The conveyor 12 is supported on a support framework 13 which includes an independent section 14 supported independently of the remainder of the supporting framework. In a preferred arrangement the independent section 14 is supported on a plurality of load cells 15 capable of delivering electric signals in dependence on the weight imposed upon them. Electric signals from the load cells are supplied to an amplifier and compensating unit 16 from which an outward signal is delivered to an indicator 17. The functions of amplifier and compensating unit 16 and indicator 17 may well be met by an "ElectroniK" potentiometric controller. The electric signals from the load cells, being dependent upon the weight impressed thereon, will be dependent upon the weight of the independent supporting structure conveyor rollers, part of the conveyor belt supported on the independent section, and the weight of material supported by this part of the conveyor belt. There is offset from the signal from the load cells the signal which would arise if there were no material on the conveyor so that the output signal delivered to the indicator 17 is dependent substantially solely on the weight of the material supported by the portion of the conveyor in the independent section. Thus the indicator which may be calibrated in terms of quantity of material conveyed per unit time can give a visual indication of the rate of material being delivered by the conveyor.

The indicator 17 is provided with upper and lower limit contacts which are preferably manually adjustable to desired maximum and minimum values above and below a predetermined desired feed rate of material, such that when the feed rate of material is less than or greater than the desired minimum and maximum respectively, the lower and upper limit contacts are closed.

Circuits including the upper and lower limit contacts are extended to a controller 18 connected in a circuit supplying electricity from a source 19 to the electrically operated vibratory feeder 11 and such that when the lower limit contacts provided with the indicator 17 are closed the electricity supply to the feeder is modified to cause the feeder to deliver material at a greater rate, and vice versa.

Figure 2:
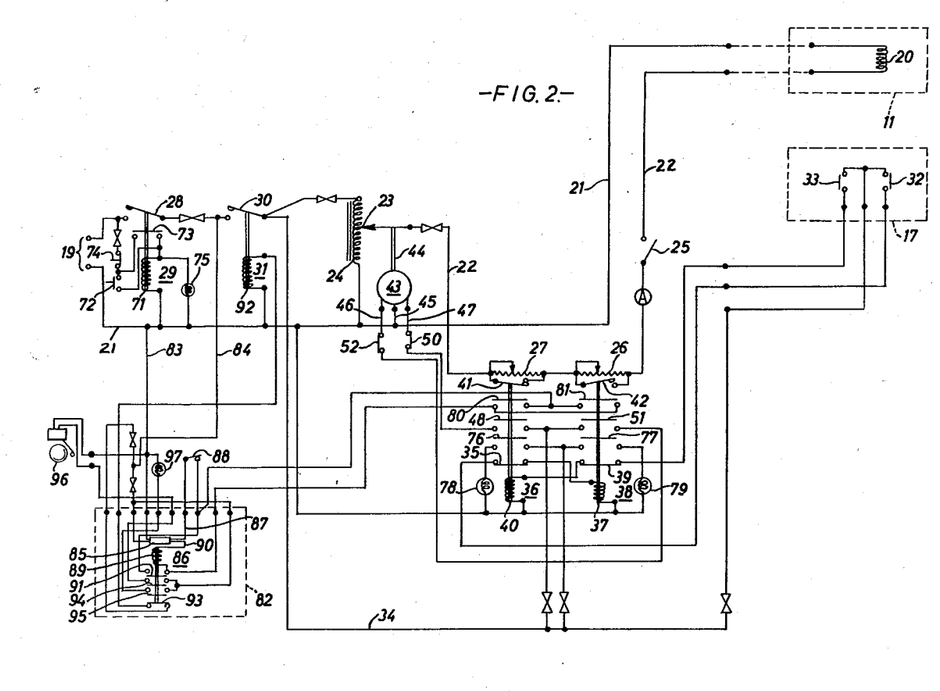
Fig. 2 is a circuit diagram of one suitable form of controller for use in the embodiment of Fig. 1.

One suitable form of controller is illustrated in the circuit diagram of Fig. 2. The operating coil 20 of the vibratory feeder 11 is connected via lead 21 to the neutral of a single phase electricity supply 19, and via lead 22 to a variable tapping contact 23 of a continuously adjustable auto-transformer 24 through a series circuit including a switch 25, a first series resistor 26, and a second series resistor 27. The other side of the electricity supply 19 is extended through contacts 28 of a main contactor 29 and contacts 30 of an auxiliary contactor 31 to one end of the auto-transformer 24 the other end of which is connected to the line 21.

The lower and upper limit contacts of the indicator 17 are indicated at 32 and 33 respectively. One side of the electricity supply from contacts 30 of contactor 31 is fed by lead 34 to one side of each of the upper and lower limit contacts, the other side of the lower limit contacts 32 is extended through normally closed interlocking contacts 35 of a decrease contactor 36 through operating coil 37 of an increase contactor 38; the other side of upper limit contacts 33 is extended through normally closed interlocking contacts 39 of the increase contactor 38 to operating coil 40 of the decrease contactor 36. The normally closed contacts 41 of the decrease contactor 36 are connected across the resistor 27, and normally open contacts 42 of the increase contactor 38 are connected across the resistor 26.

The variable tapping contact 23 of the auto-transformer 24 is driven by a reversing electric servo-motor 43 via a mechanical transmission 44 which includes a lost motion connection such that after the moving contact 23 has been driven in a given direction by the electric motor 43 a predetermined amount of rotation of the motor 43 in the opposite direction is necessary before movement can be imparted to the moving contact 23 in the direction opposite to its previous movement. The design of the motor 43 is such that when an electric supply is connected between a common lead 45 and one terminal lead 46 the motor will rotate in one direction and when an electricity supply is connected between the common lead 45 and a second terminal lead 47 the motor will rotate in the opposite direction. Rotation of the motor 43 in the first direction will, after lost motion, advance the movable contact 23 towards the higher voltage end 24 of the auto-transformer, and vice versa. Lead 34 is extended via normally open contacts 48 of the decrease contactor 36 and a limit switch 50 to the terminal lead 47, and via normally open contacts 51 of the increase contactor 38 and limit switch 52 to the terminal lead 46. The limit switches 50 and 52 are normally closed and are arranged to be opened when the moving contact 23 has been driven to the lower or upper limit of its travel respectively.

In operation the main contactor 29 and the auxiliary contactor 31 are closed as will be hereinafter described and an electricity supply from the auto-transformer 24 is extended through normally closed contacts 41 of the decrease contactor 36, the resistor 26 and the switch 25 to the operating coil 20 of the vibratory feeder. If the rate of delivery of material by the conveyor is too high the upper limit contacts 33 are closed and an electricity supply is extended through lead 34, contacts 33, and normally closed contacts 39 to the coil 40 of the decrease contactor 36. Operation of the decrease contactor 36 opens normally closed contacts 35 to interrupt the circuit to the operating coil 37 of the increase contactor 38, and normally closed contacts 41 are opened to insert the resistor 27 in series with the operating coil 20 of the vibratory feeder, thereby to decrease the rate of material delivered by the feeder. At the same time normally open contacts 48 are closed to complete a circuit from lead 34 through the limit switch 50 to the terminal lead 47 of the motor 43 to cause that motor to rotate in a direction to drive the moving contact 23 towards the lower voltage end of the auto-transformer 24. Movement of the moving contact 23 may not take place immediately but only after a time lag determined by the lost motion connection in the transmission 44. In many cases the insertion of the resistor 27 may have the desired corrective effect and movement of the moving contact 23 may not be required. It will be appreciated that in this case the provision of the lost motion connection in the transmission 44 obviates movement of the moving contact 23 taking place at every operation of the decrease or increase contactor 36 or 38. When the rate of delivery has been corrected the upper limit contacts 33 will be opened, the decrease contactor 36 released, the motor 43 disconnected and the resistor 27 short-circuited by the contacts 41. If, on the other hand, the rate of delivery is too small, the lower limit contacts 32 will be closed to extend the circuit from line 34 through normally closed interlocking contacts 35 of the decrease contactor 36 to the operating coil 37 of the increase contactor 38. Upon operation of the contactor 38, the normally closed interlocking contacts 39 are opened to interrupt the operating circuit of the coil 40 of the decrease contactor 36 and contacts 42 are closed to short-circuit the resistor 26 in series with the operating coil 20 of the vibratory feeder 11. In many cases the short-circuiting of the resistor 26 will effect the required increase in the feed of material via the vibratory feeder 11. In case the short-circuiting of the resistor 26 is insufficient, a circuit is also completed through normally opened contacts 51, closed upon operation of the contactor 38, and limit switch 52 to the terminal lead 46 of the electric motor 43 and in like manner as previously described, the moving contact 23 may be displaced, in this case towards the high voltage end of the auto-transformer 24. In like manner when the desired rate of feed of material has been restored sufficiently towards the predetermined amount the lower limit contacts 32 are opened to release the increase contactor 38, re-insert the series resistor 26 and disconnect the motor 43.

Figure 3:
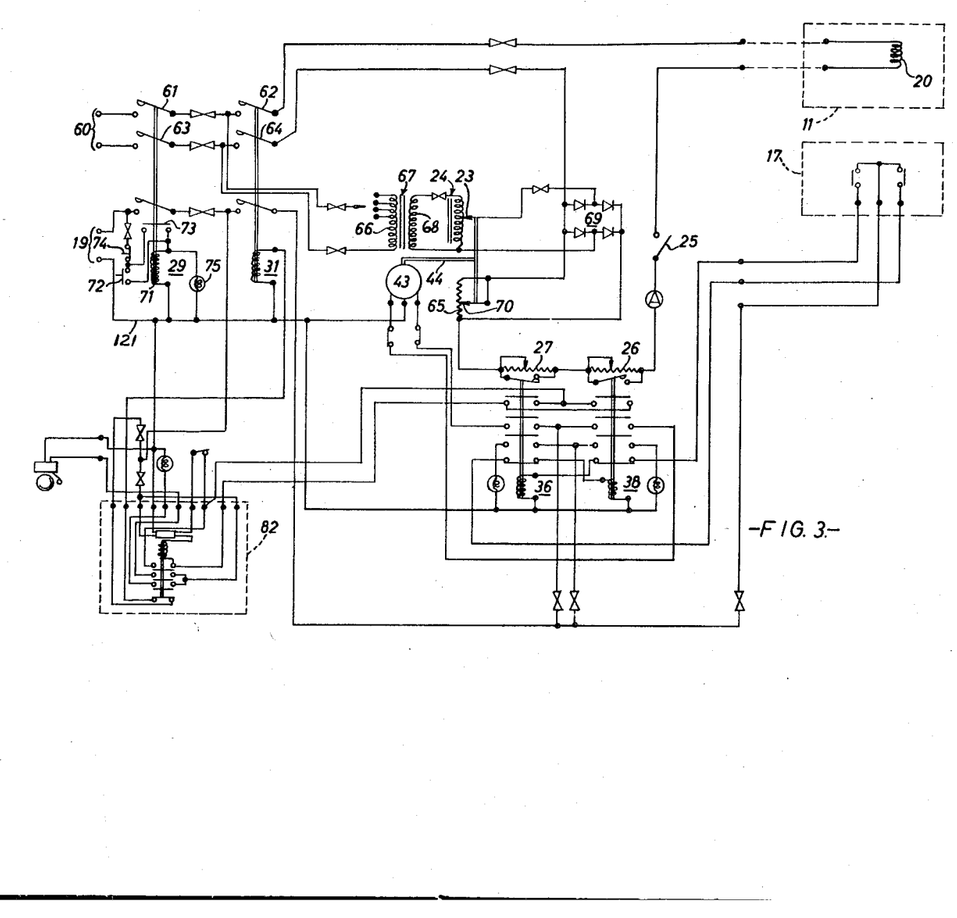
Fig. 3 is a circuit diagram of another suitable form of controller.

In the alternative controller circuit illustrated in Fig. 3, one side of the operating coil 20 of the vibratory feeder 11 is connected to one side of an electricity supply 60 through contacts 61 of main contactor 29 and contacts 62 of auxiliary contactor 31, whilst the other side of the coil 20 is connected to the other side of the electricity supply 60 through contacts 63 of the main contactor 29, contacts 64 of the auxiliary contactor 31, a resistor 65, the resistors 27 and 26, and the switch 25. Also connected across the electricity supply 60 through the contacts 61 and 63 is the primary winding 66 of an isolating transformer 67 of which the secondary winding 68 is connected to the variable auto-transformer 24. The moving contact 23 of the auto-transformer 24 and the low voltage end thereof are connected via a full wave rectifier 69 to the ends of the resistor 65. A moving contact 70 connected to one end of the resistor 65 is mechanically coupled to the moving contact 23 of the variable auto-transformer 24 and both are connected through the lost motion driving connection 44 to the motor 43 such that when the moving contact 23 is at the low voltage end of the auto-transformer 24 the resistor 65 is short-circuited, and conversely when the moving contact 23 is at the high voltage end of the auto-transformer 24 the whole of the resistor 65 is in circuit. With the arrangement illustrated in Fig. 3 which embodies the decrease contactor 36 and the increase contactor 38 in the same manner as described in Fig. 2, the control and the operation of the vibratory feeder 11 is effected by varying the wave-form of the electricity supply extended to its operating coil 20 by injecting a pulsating D.C. potential developed across the series resistor 65.

In both the embodiments illustrated in Figs. 2 and 3 the main contractor 29 has an operating coil 71 one end of which is connected to the neutral of the electricity supply 19 through the lead 21 in the case of Fig. 2 and through the lead 14 in the case of Fig. 3. The other end of the operating coil is connected to a start push button 72 in parallel with normally open hold-on contacts 73 to the live side of the electricity supply 19 through a stop push button switch 74. Depression of the start push button 72 causes energizing of the operating coil 71 to close the main contactor, whereupon the operating coil subsequently remains energised from the hold-on contacts 73. Depression of the stop push button 74 interrupts the circuit through the coil 71 to effect release of the contactor.

For supervisory purposes a number of indicator lamps may be provided. First indicator lamp 75 is connected in parallel with the operating coil 71 of the main contactor, and serves as a pilot light. The decrease and increase contactors 36 and 38 may be provided with auxiliary contacts 76 and 77 respectively for completing circuits to two further indicator lamps 78 and 79, so that the lamp 78, which may be conveniently red, can be illuminated when the rate of material discharge is too high, or the lamp 79, which may conveniently be green, when the rate of discharge is too low. To provide a warning in event of the control system of the present invention not being able to correct the discharge rate of material within a predetermined time interval, the decrease and increase contactors 36 and 38 may also be provided with supervisory contacts 80 and 81 respectively for providing a signal to a timing device indicated generally at 82, when either of these contactors is operated. A supply is extended to the timer 82 through leads 83, 84 connected respectively to the neutral of the electricity supply 19, and to the live side of that supply through contacts 28 of the main contactor 29. The timing unit 82 includes a timer 85 connected in circuit with a relay 86, such that when a circuit is completed from a lead 87 through a normally closed reset switch 88 and either of the supervisory contacts 80, 81 on the contactors 36, 38 and the coil 89 of the relay 86 to the lead 90, the relay does not operate immediately but only after a predetermined time delay from the completion of this circuit. Such time delay may readily be adjusted as required, and may conveniently be within the range of 10 to 60 seconds. If either or both of the supervisory contacts 80, 81 remain closed for the predetermined time interval, the relay 86 is operated and by means of hold-on contacts 91 remains operated independently of the subsequent release of the supervisory contacts 80, 81. The hold-on circuit for the relay 86 can be interrupted to reset the timing unit by manual operation of the switch 88.

The auxiliary contactor 31 is associated with the timing unit 82, and a circuit to an operating coil 92 of the auxiliary contactor is extended from the line 84 through normally closed contacts 93. Thus, when the relay 86 is released, the circuit to the operating coil of the auxiliary contactor 31 is completed for the operation of that contactor. Upon operation of the relay 86 the circuit to the operation coil of the auxiliary contactor is broken, thereby disconnecting the auto-transformer 24 and the contactor 36, 38 and the motor 43 to shut down the vibratory feeder 11. The relay 86 is also provided with normally open contacts 94 and 95 for extending a supply from lead 84 to an audible warning device 96 and an alarm indicator lamp 97 respectively.

In the case where a plurality of hoppers and vibratory feeders are provided for depositing materials onto a common conveyor, the upper and lower limit contacts of the indicator 17 may be associated with decrease and increase contactors in a plurality of controllers, each associated with an individual vibratory feeder. If desired, the moving contacts 23 of the adjustable auto-transformer 24 in each of such plurality of such controllers may be under the control of a single electric motor 43. It is convenient to provide clutch motions between a driving member of the lost motion driving connection and each moving contact, so that the position of the moving contact 23 of any one of the adjustable auto-transformers 24 can be adjusted relatively to the positions of the moving contacts on the other auto-transformers to obtain any desired ratio of operation rates of the vibratory feeders.

One form of controller suitable for use with a plurality of hoppers will be described with reference to Fig. 4 in which wherever possible like reference numerals have been used to refer to like parts in Figs. 2 and 3. For simplicity suffix letters are applied to some reference numerals which denote a particular part associated individually with a particular feeder unit, the letter a denoting the first feeder unit, the letter b the second, and the letter z the last. It is to be understood that if there are only two units then the second will be the last. The use of the suffix z does not imply that there can be neither more nor less than 26 units, but is simply for the sake of convenience. In the drawing the broken line rectangles a, b denote circuit networks associated with the first unit and the second unit respectively, whilst the broken line rectangle z denotes a network particularly associated with the last unit. It will be appreciated that other broken line rectangles such as c exist for each other unit and each such rectangle contains substantially similar circuit elements. For the sake of simplicity only these elements associated with the first and second units are shown in detail. The circuit elements which lie outside the broken line rectangles denote control equipment common to all the units.

In the following description of the drawing the circuit network a associated with the first unit will be described in detail together with its relationship to the common control equipment. The main control equipment can readily be recognised by the fact that the reference numerals relating thereto do not carry suffix letters.

The operating coil 20a of the vibratory feeder 11a associated with the first unit is fed from an individual secondary 100a of an isolating transformer 101 whose primary 102 is connected to the electricity supply. One side of the operating coil 20a is connected to the secondary 100a through contacts 61a of a common contactor 29a. This and the corresponding main contactors enables the feeders of the corresponding units to be energised individually. The other side of the operating coil 20a is connected to the secondary 100a through contacts 63a of the main contactor, contact 64a of an auxiliary contactor 31, a resistor 65a, a resistor 26a and a resistor 27a.

The primary winding 66 of an isolating transformer 67 is connected across the electricity supply through contactor 29. One secondary winding 68 of the transformer 67, is connected to the primary of a variable auto-transformer 24a. The primaries of the corresponding auto-transformers of each of the units are connected in parallel. A moving contact 23a of the auto-transformer 24a and the low voltage end of said auto-transformer feed a full-wave rectifier 69a through an isolating transformer 103a. The rectifier outputs are connected across the resistor 65a. The resistor 65a is constructed as a potentiometer and the moving contact 70a thereof is connected to one end of the resistor.

The moving contacts 70a and 23a are coupled to a mechanical transmission 44 of a reversing electroservo motor 43 through an electromagnetic clutch 104a. The transmission 44 includes a lost motion connection. The clutch 104a can be selectively energised by an individual switch 105a through rectifier bridge 106a. When the clutch is de-energised the moving contacts 70a and 23a may be adjusted together independently of the transmission 44 by means of the handwheel 107a to adjust the rate of feed of the feeder 11a relatively to the other feeders. Normally closed limit switches 50a and 52a are associated with the variable auto-transformer 24a. These limit switches are in circuit with the motor 43 to prevent over-running of the auto-transformer and potentiometer contacts 23a and 70a. The corresponding limit switches of all the variable auto-transformers are connected respectively in two common series protective circuits.

The lower limit contacts 32 are connected in circuit with a further secondary winding 108 of the transformer 29, normally closed interlocking contacts 35 of a decrease contactor 36, and an operating coil 37 of an increase contactor 38. The upper limit contacts 33 are connected in circuit with the secondary winding 108, normally closed interlocking contacts 39 of the increase contactor 38, and an operating coil 40 of the decrease contactor 36. Normally closed contacts 41a, of the decrease contactor 36 are connected across the resistor 27a. Normally open contacts 42a of the increase detector 38 are connected across the resistor 26a.

The common end of two phased windings of the servo-motor 43 are connected through a common load 45 to one side of the transformer secondary winding 108. One terminal lead 46, is connected through limit switch 52a and normally open contacts 51 of the increase contactor 38 to the other side of the transformer secondary 108; the other terminal load 47, is connected through the limit switch 50a, and the normally open contacts 48 of the decrease contactor 36 to said other side of the transformer secondary winding 108.

In operation the contactors such as 29a, are closed whereupon an electricity supplies from the secondary windings of transformer 101 are extended to the operating coils of the vibratory feeders through the normally closed contacts such as 41a, of the decrease contactor 36, the resistors such as 26a, the resistors such as 65a, and the contacts such as 64a. Referring once again for simplicity to the single network a the transformer 103a injects a pulsating D.C. potential developed across the series resistor 65a through the associated rectifier network 69a. This injected potential varies the waveform applied to the feeder coil 20a and in this manner acts to in part control the operation and output of the corresponding feeder.

If the rate of delivery of material by the conveyor becomes too high the upper limit contacts 33 are closed and hence the decrease contactor 36 is energised through the normally closed contacts 39 of the increase contactor 38. Energisation of the decrease contactor 36 opens normally closed contacts 35 to interrupt the circuit to the operating coil 37 of the increase contactor 38, and also opens normally closed contacts 41a to insert the resistor 27a in series with the corresponding operating coil 20a, thereby to decrease the rate of feed of all the feeders. At the same time normally open contacts 48 are closed to complete the circuit to one phase winding of the motor 43 to cause it to rotate in a direction to drive the moving contact 23a towards the lower voltage end of the variable auto-transformer 24a, and to drive the moving contact 70a in a direction tending to short-circuit resistor 65a. Movement of these moving contacts does not take place immediately but only after a time-lag determined by the lost motion connection in the transmission 44. In many cases insertion of the resistor 27a in circuit with the corresponding vibratory feeder operative coil 20a may have the desired corrective effect and movement of the contacts 23a and 70a will not take place. Thus the lost motion connection obviates unnecessary hunting of the moving contacts. When the rate of delivery has been corrected the upper limit contacts 33 will open and the decrease contactor 36 be released to de-energise the motor 43 and short-circuit the resistor 27a by the contact 41a.

If the rate of delivery is too small the lower limit contacts 32 will be closed to energise coil 37 of the increase contactor 38 through normally closed contacts 35 of the decrease contactor 36. On operation of the contactor 38 the normally closed interlocking contacts 39 are opened to interrupt the operating circuit of the coil 40 of the decrease contactor 36 and contact 42a is closed to short-circuit the resistor 26a which is in series with the operating coil 20a of the corresponding vibratory feeder. In many cases short-circuiting of this resistor will effect the required increase in the rate of feed, and operation of the motor 43 will not be necessary. In case short-circuiting of the resistor 26a is insufficient the closing of normally open contacts 51 of the increase contactor 38 will energise the appropriate one of the windings of motor 43 and after the lost motion of the transmission 44 has been effected the moving contact 23a will be adjusted towards the high voltage end of the auto-transformer 24a and the moving contact 70a will be adjusted in a direction to increase the effective value of the resistor 65a. When the desired rate of feed of material has been restored sufficiently towards the predetermined desired value the lower limit contacts 32 will open to release the increase contactor 38, re-insert the series resistor 26a, de-energise the motor 43.

In both cases movement of the auto-transformer contact 23a will vary the auto-transformer output to the corresponding transformer 103a, and hence vary the injected pulsating D.C. developed across the resistor 65a, at the same time the effective values of these resistors being varied to assist in the necessary correction. As discussed earlier a variation in the injected pulsating D.C. voltage will vary the waveform applied to the feeder coil 20a and affect its operation in the desired manner.

For supervisory purposes a number of indicator lamps are provided. A first series of indicator lamps 75 and such as 75a are connected to pilot contacts on the contactors 29 and such as 29a and serve as pilot lights. The decrease and increase contactors 36 and 38 are respectively provided with normally open auxiliary contacts 76, 77 disposed in circuit with two further auxiliary lamps 78, 79. The lamp 78 which may be red is illuminated when the rate of material discharged is too high; the lamp 79 which may be green is illuminated when the rate of discharge is too low. To provide a warning in the event of the control system of the present invention not being able to correct the discharge rate of material within a predetermined time interval the decrease and increase contactors 36 and 38 are respectively provided with supervisory contacts 80 and 81. These supervisory contacts provide a signal for a timing device indicated generally at 82 when either of the contactors 36, 38 is energised. A power supply from the transformer secondary 108 is taken to the device 82 through leads 83 and 84. The device includes a timer 85 connected in circuit with a relay 86 such that when a circuit is completed from the lead 87 through a normally closed reset switch 88, through either of the supervisory contacts 80 and 81 on through the contactors 36 and 38, and the coil 89 of the relay 86 to the lead 90, the relay does not operate immediately but only after a predetermined time delay. This time delay may be adjusted as required and is conveniently within the range of 10 to 60 secs. If either or both of the supervisory contacts 80 and 81 remain closed for the predetermined time interval the relay 86 is operated and remains operated through hold-on contacts 91 independently of the subsequent release of the supervisory contacts 80 and 81. The hold-on circuit for the relay 86 can be interrupted to reset the timing unit by manual operation of the switch 88.

The auxiliary contactor 31 is associated with the timing unit 82 and a circuit to the operating coil 92 of the auxiliary contactor is extended from the transformer secondary 108 through normally closed contacts 93. Thus when the relay 86 is released the circuit through the operating coil of the auxiliary contactor 31 from the transformer secondary winding 108 is completed for the operation of that contactor. Operation of the relay 86 breaks the circuit of the auxiliary contactor operating coil. This causes the contacts such as 64a to return to their normal open condition so that the supply circuits of the several feeder coils such as 20a are broken and the operation of the plant ceases. The relay 86 is also provided with normally open contacts 94, 95 for extending the supply from the lead 84 to warning terminals 96 and an alarm indicator lamp 97. A device for providing an audible warning, such as a hooter, can be connected to the terminals 96. A warning light 109 is associated with the auxiliary contactor 31.

Figure 4:
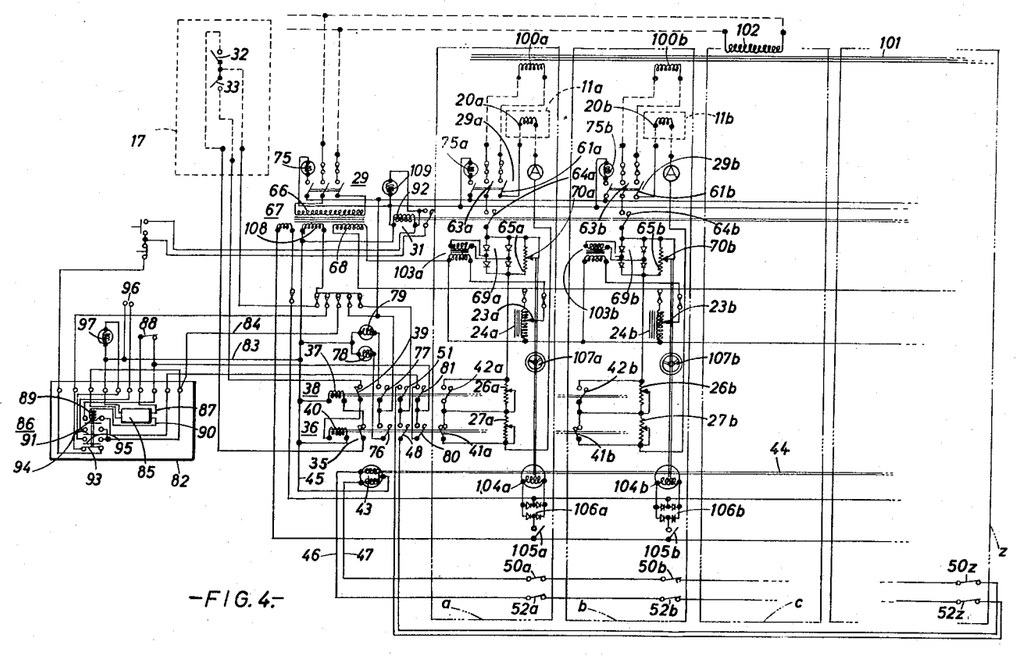
Fig. 4 is a circuit diagram of a still further suitable form of controller.

It will be appreciated that in operation of any of the circuits of Figs. 2, 3 and 4 closing of either the upper or lower limit contacts causes immediate correction to be applied, either by the insertion of the resistors such as 27, 27a or by the short-circuiting of the resistors such as 26, 26a in the respective feeder coil circuits. In many cases this will provide sufficient correction and the rate of feed will have been corrected before the lost motion of the motor 43 produces appropriate movement of the moving contacts such as 23, 23a and 70, 70a. In practice for given operating conditions as determined by manual adjustment of the upper and lower limit contacts of the indicator 17 it is found that the values of the resistors such as 26, 26a and 27, 27a may be so adjusted that they are suitable to take care of most variations in the rate of feed and that movement of the moving contacts is comparatively rarely necessary. In practice the rate of delivery of material by the conveyor in a unit of time, for example 10 minutes, can be maintained substantially constant; moreover rates of delivery of material in successive units of time can also be maintained substantially constant.

It is not essential for only a part or section of the conveyor to be supported on the load cells and if the conveyor is made short in length, for example of the order of as little as four or five feet, the whole of the conveyor and its supporting structure can be carried on load cells. A short conveyor so supported can conveniently form a unit which may be interposed anywhere in an existing conveyor system and the rate of operation of one part of such existing system which part can serve as the feeder system delivering material onto the short conveyor can be controlled in response to the signals from the load cells. Alternatively a vibratory feeder can deliver material on to the short conveyor and the rate of operation of said vibratory feeder can be controlled in response to the signals from the load cells whilst the short conveyor can deliver the material at a substantially constant rate onto any desired receiver which can be any form of conveyor and need not be an endless belt conveyor.

In many cases it is desirable that the speed of the conveyor supported on the load cells should be substantially constant.

The amplifier may be of any convenient type, for example it may be a conventional substantially constant gain electron tube amplifier or it may be a magnetic amplifier or embody transistors.

I claim:

1. Apparatus for feeding at a substantially controlled rate, granular materials capable of flowing, comprising a movable endless conveyor, at least one load cell supporting at least a part of a supporting framework for the conveyor and responsive to weight superimposed thereon, a feeder system including a vibratory feeder for supplying material to said conveyor, electric driving means for said vibratory feeder, means for delivering from said load cells electric signals commensurate with the instantaneous weight of material on at least a part of said conveyor, an indicator responsive to said electric signals, manually adjustable upper and lower limit contacts on said indicator, first and second switching means, an auto-transformer having a variable tapping for providing an electricity supply, electric circuit means including two series connected resistors connecting the electric driving means of said vibratory feeder with said auto-transformer, said first switching means being responsive to the closing of said lower limit contacts and having normally closed contacts connected in parallel with one of said resistors, said second switching means being responsive to the closing of said upper limit contacts and having normally open contacts connected in parallel with the second of said resistors, a reversible electric motor, lost motion mechanical coupling means between said reversible electric motor and said variable tapping of said auto-transformer for mechanically driving said variable tapping, auxiliary contacts on said first switching means for completing a circuit between said reversible electric motor and an electricity supply for driving said electric motor in a direction to increase the output voltage at the variable tapping of said auto-transformer, and auxiliary contacts on said second switching means for completing a circuit between said reversible electric motor and said electricity supply for driving said reversible electric motor in a direction to decrease the output voltage at said variable tapping of said auto-transformer.

2. Apparatus for feeding at a substantially controlled rate, granular materials capable of flowing, comprising a movable endless conveyor, at least one load cell supporting at least a part of a supporting framework for the conveyor and responsive to weight superimposed thereon, a feeder system including a vibratory feeder for supplying material to said conveyor, electric driving means for said vibratory feeder, means for delivering from said load cells electric signals commensurate with the instantaneous weight of material on at least a part of said conveyor, an indicator responsive to said electric signals, manually adjustable upper and lower limit contacts on said indicator, first and second switching means, electric circuit means including three series connected resistors connecting the electric driving means of said vibratory feeder with an electricity supply, said first switching means being responsive to the closing of said lower limit contacts and having normally closed contacts connected in parallel with one of said resistors, said second switching means being responsive to the closing of said upper limit contacts and having normally open contacts connected in parallel with a second of said resistors, an auto-transformer having a variable tapping, rectifying means deriving an electricity supply from said variable tapping of said auto-transformer for applying a direct current potential across a third of said resistors, a reversible electric motor, lost motion mechanical coupling means between said reversible electric motor and said variable tapping of said auto-transformer for mechanically driving said variable tapping, auxiliary contacts on said first switching means for completing a circuit between said reversible electric motor and an electricity supply for driving said electric motor in a direction to increase the output voltage at said variable tapping of said auto-transformer, and auxiliary contacts on said second switching means for completing a circuit between said reversible electric motor and said electricity supply for driving said reversible electric motor in a direction to decrease the output voltage at said variable tapping of said auto-transformer.

3. Apparatus according to claim 2, said third resistor being a variable resistor and having a moving contact, mechanical means coupling said moving contact with said variable tapping such that the magnitude of said third resistor in said series circuit is reduced with movement of said variable tapping to decrease the output voltage at said variable tapping and said magnitude is increased upon movement of said variable tapping to increase said output voltage.

4. Apparatus for feeding at a substantially controlled rate, granular materials capable of flowing, comprising a movable endless conveyor, at least one load cell supporting at least a part of a supporting framework for the conveyor and responsive to weight superimposed thereon, a feeder system including a plurality of vibratory feeders for supplying material to said conveyor, electric driving means for each of said vibratory feeders, means for delivering from said load cells electric signals commensurate with the instantaneous weight of material on at least a part of said conveyor, an indicator responsive to said electric signals, manually adjustable upper and lower limit contacts on said indicator, first and second switching means, a transformer having a plurality of secondary windings, one for each of said electric driving means, electric circuit means individual to each of said driving means for connecting an individual driving means to an individual one of said secondary windings, each circuit means including first, second and third series connected resistors, said first switching means being responsive to the closing of said lower limit contacts and having a plurality of normally closed contacts one for each of said electric circuit means and each connected in parallel with an individual one of said first resistors, said second switching means being responsive to the closing of said upper limit contacts and having a plurality of normally open contacts, one for each of said electric circuit means and each connected in parallel with an individual one of said second resistors, a plurality of auto-transformers one for each electric circuit means and each having a variable tapping, a plurality of rectifying means one for each of said electric circuit means and each deriving an electricity supply from said variable tapping of an individual one of said auto-transformers for applying a direct current potential across an individual one of said third resistors, a reversible electric motor, a plurality of lost motion mechanical coupling means between said reversible electric motor and the variable tappings of said auto-transformers for mechanically driving said variable tappings, auxiliary contacts on said first switching means for completing a circuit between said reversible electric motor and an electricity supply for driving said electric motor in a direction to increase the output voltages at the variable tappings of said auto-transformers, auxiliary contacts on said second switching means for completing a circuit between said reversible electric motor and said electricity supply for driving said reversible electric motor in a direction to decrease the output voltages at the variable tappings of said auto-transformers, each of said third resistors being a variable resistor and having a moving contact, mechanical means coupling the moving contact of an individual one of said third resistors with the variable tapping of an individual auto-transformer assocated therewith such that the magnitude of each of said third resistors in an electric circuit means is reduced with movement of the variable tapping of the associated auto-transformer to decrease the output voltage at said variable tapping and said magnitude is increased upon movement of said variable tapping to increase said output voltage, and a plurality of clutch means each individual to an electric circuit means and disposed between said lost motion mechanical coupling means and the variable tapping of an individual auto-transformer whereby to permit adjustment of the variable tapping of any one auto-transformer relatively to the positions of variable tappings on other auto-transformers.

5. Apparatus for feeding at a substantially controlled rate, granular materials capable of flowing, comprising an electrically operated vibratory feeder, a continuously moving endless conveyor to receive material from the feeder, weight responsive means carrying at least a part of said conveyor, two series resistors and a variable auto-transformer in the electrically operated vibratory feeder circuit, a variable tapping on said auto-transformer, a reversible electric motor, a lost motion mechanical coupling from said reversible motor to said variable tapping, means operated by said weight sensitive means for placing in circuit one of said resistors and driving the reversible motor in one direction to decrease the voltage in said circuit when the weight of material superimposed thereon is overweight, and means operated by said weight responsive means to short-circuit the other one of said resistors and to drive said reversible motor in reverse direction to increase the voltage in said circuit when the weight of material superimposed thereon is underweight.

6. Apparatus for feeding at a substantially controlled rate, granular materials capable of flowing, comprising a movable endless conveyor, at least one load cell supporting at least part of a supporting framework for the conveyor and responsive to weight superimposed thereon, a feeder system including an electrically operated vibratory feeder for supplying material to said conveyor, an indicator responsive to electric signals from said load cells, upper and lower limit switches on said indicator, electric circuit means connecting said vibratory feeder with an electricity supply through two series resistors and a variable auto-transformer, a reversible electric motor, a lost motion mechanical driving connection between said reversible electric motor and a variable tapping on said auto-transformer for mechanically driving said variable tapping, first switch means responsive to the closing of said lower limit switch and having normally closed contacts connected in parallel with a first one of said series resistors and normally open contacts for completing a circuit between said reversible electric motor and an electricity supply for driving said electric motor in a direction to increase the output voltage at said variable tapping of said auto-transformer, and second switching means responsive to the closing of said upper limit switch and having normally open contacts connected in parallel with a second one of said resistors and normally open contacts for completing a circuit between said reversible electric motor and said electricity supply for driving said reversible electric motor in a direction to decrease the output voltage at said variable tapping of said auto-transformer.

7. Apparatus for feeding at a substantially controlled rate, granular materials capable of flowing, comprising an electrically operated vibratory feeder, a continuously movable endless conveyor to receive material from the feeder, weight responsive means carrying at least a part of said conveyor, two series resistors and a variable auto-transformer in the electrically operated vibratory feeder circuit, a variable tapping on said auto-transformer, a reversible electric motor, a lost motion mechanical coupling between said reversible motor and said variable tapping, means operated by said weight sensitive means for placing in circuit one of said resistors and driving the reversible motor in one direction to decrease the voltage at the variable tapping of said auto-transformer when the weight of material superimposed thereon is overweight, and means operated by said weight responsive means to short-circuit the other of said resistors and to drive said reversible motor in reverse direction to increase the voltage at the variable tapping of said auto-transformer when the weight of material superimposed thereon is underweight.

8. Apparatus for feeding at a substantially controlled rate, granular materials capable of flowing, comprising an electrically operated vibratory feeder, a continuously moving endless conveyor to receive material from the feeder, weight responsive means carrying at least a part of said conveyor, three series resistors, rectifying means and a variable auto-transformer in the electrically operated vibratory feeder circuit, a variable tapping on said auto-transformer, a reversible electric motor, a lost motion mechanical coupling between said reversible electric motor and said variable tapping, means operated by said weight sensitive means for placing in circuit a first one of said resistors and driving the reversible motor in one direction to decrease the voltage at the variable tapping of said auto-transformer when the weight of material superimposed thereon is overweight, and means operated by said weight responsive means to short-circuit a second one of said resistors and to drive said reversible motor in reverse direction to increase the voltage at the variable tapping of said auto-transformer when the weight of material superimposed thereon is underweight, said rectifying means being connected between said variable tapping and one end of said auto-transformer and a third one of said resistors.

9. Apparatus for feeding at a substantially controlled rate, granular materials capable of flowing, comprising a movable endless conveyor, at least one load cell supporting at least a part of a supporting framework for the conveyor and responsive to weight superimposed thereon, a feeder system including a vibratory feeder for supplying material to said conveyor, electric driving means for said vibratory feeder, means for delivering from said load cells electric signals commensurate with the instantaneous weight of material on at least a part of said conveyor, an indicator responsive to said electric signals, manually adjustable upper and lower limit contacts on said indicator, first and second switching means, electric circuit means including first, second and third series connected resistors connecting the electric driving means of said vibratory feeder with an electricity supply, said third resistor having a variable tapping, said first switching means being responsive to the closing of said lower limit contacts and having normally closed contacts connected in parallel with said first resistor, said second switching means being responsive to the closing of said upper limit contacts and having normally open contacts connected in parallel with said second resistor, an auto-transformer having a pair of input terminals for connection to an electricity supply and a pair of output terminals, a variable tapping in said auto-transformer and connected to one of said transformer terminals, rectifying means connected to the output terminals of said auto-transformer and to one end and said variable tapping of said third resistor for supplying a direct current potential thereacross, a reversible electric motor, direct mechanical coupling means between said variable tapping of said auto-transformer and said variable tapping of said third resistor so that the effective resistance of said third resistor is reduced with movement of said variable tapping to decrease the voltage at the output terminals of said auto-transformer and vice versa, lost motion mechanical coupling means between said reversible electric motor and said direct mechanical coupling means for mechanically driving said variable tappings, auxiliary contacts on said first switching means for completing a circuit between said reversible electric motor and an electricity supply for driving said electric motor in a direction to increase the voltage of said terminals of said auto-transformer, and auxiliary contacts on said second switching means for completing a circuit between said reversible electric motor and said electricity supply for driving said reversible electric motor in a direction to decrease the voltage on said output terminals of said auto-transformer.

10. Apparatus for feeding at a substantially controlled rate, granular materials capable of flowing, comprising a movable endless conveyor, at least one load cell supporting at least a part of a supporting framework for the conveyor and responsive to weight superimposed thereon, a feeder system including a plurality of vibratory feeders for supplying material to said conveyor, electric driving means for each of said vibratory feeders, means for delivering from said load cells electric signals commensurate with the instantaneous weight of material on at least a part of said conveyor, an indicator responsive to said electric signals, manually adjustable upper and lower limit contacts on said indicator, first and second switching means, a transformer having a plurality of secondary windings, one for each of said electric driving means, electric circuit means individual to each of said driving means for connecting an individual driving means to an individual one of said secondary windings, each circuit means including first, second and third series connected resistors, each of said third resistors having a variable tapping, said first switching means being responsive to the closing of said lower limit contacts and having a plurality of normally closed contacts one for each of said electric circuit means and each connected in parallel with an individual one of said first resistors, said second switching means being responsive to the closing of said upper limit contacts and having a plurality of normally open contacts one for each of said electric circuit means and each connected in parallel with an individual one of said second resistors, a plurality of auto-transformers one for each electric circuit means and each auto-transformer having a pair of input terminals for connection to an electricity supply, a pair of output terminals and a variable tapping connected to one of said terminals, a plurality of rectifying means one for each of said circuit means and each connected to the output terminals of an individual one of said auto-transformers and to one end of said variable tapping of an individual one of said third resistors, a reversible electric motor, a plurality of direct mechanical coupling means one for each of said circuit means and each between said variable tapping of an individual one of said auto-transformers and said variable tapping of the corresponding one of said third resistors, such that the effective resistance of each of said third resistors is reduced with movement of said variable tapping of the corresponding auto-transformer to decrease the voltage on the output terminals thereof and vice versa, a plurality of lost motion mechanical coupling means between said reversible electric motor and of said direct mechanical coupling means for mechanically driving said variable tappings, auxiliary contacts on said first switching means for completing a circuit between said reversible electric motor and an electricity supply for driving said electric motor in a direction to increase the voltages at said output terminals of said auto-transformers, auxiliary contacts on said second switching means for completing the circuit between said reversible electric motor and said electricity supply for driving said reversible electric motor in a direction to decrease the voltages at said output terminals of said auto-transformers, and a plurality of adjusting means each individual to an electric circuit means and permitting adjustment of the variable tapping of one of said auto-transformers relatively to the position of said variable tapping of another of said auto-transformers.

References Cited in the file of this patent

UNITED STATES PATENTS

| | | |
|---|---|---|
| 1,922,883 | Crago | Aug. 15, 1933 |
| 2,276,383 | Francis | Mar. 17, 1942 |
| 2,429,864 | Alvord | Oct. 28, 1947 |
| 2,609,965 | Kast | Sept. 9, 1952 |